United States Patent Office 2,907,694
Patented Oct. 6, 1959

2,907,694

21-HALOSTEROIDS

Eugene J. Agnello and Gerald D. Laubach, Jackson Heights, N.Y., assignors to Chas. Pfizer & Co., Inc., New York, N.Y., a corporation of Delaware No Drawing. Application April 25, 1957
Serial No. 654,984

6 Claims. (Cl. 167—65)

This invention is concerned with 21-fluoro derivatives of $\Delta^{4,6}$-corticosteroids and $\Delta^{1,4,6}$-corticosteroids. These novel compounds are valuable synthetic hormones which are of especial use in the treatment of rheumatoid arthritis. A process for their preparation is included within the scope of the present invention. This invention also relates to the new and useful intermediates necessary for the production of the compounds with which we are concerned, as well as to the method of producing these intermediates.

The 21-fluoro-$\Delta^{4,6}$-corticosteroids and 21-fluoro-$\Delta^{1,4,6}$-corticosteroids included within the scope of the present invention comprise compounds selected from the class consisting of:

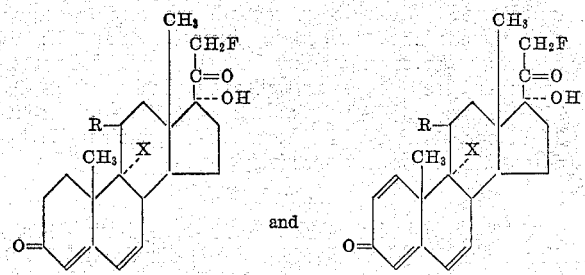

wherein R is chosen from the group consisting of keto and $\beta$-hydroxyl, and X is chosen from the group consisting of $\alpha$-hydrogen, $\alpha$-fluorine, $\alpha$-chlorine, $\alpha$-bromine and $\alpha$-iodine. There are also included in this invention pharmaceutical compositions comprising a compound as described above together with pharmaceutically acceptable carriers.

In accordance with the present invention, it has been unexpectedly discovered that the 21-fluoro-$\Delta^{4,6}$-corticosteroids and 21-fluoro-$\Delta^{1,4,6}$-corticosteroids described herein produce in full measure all the beneficial effects of cortisone without any serious side effects; in particular, they have been found to possess more adrenocortical activity than cortisone. In addition to being more effective than currently available materials already disclosed in the prior art with regard to the control of the inflammatory manifestations of rheumatoid arthritis, metabolic studies have shown these 21-fluoro-$\Delta^{4,6}$-corticosteroids not to cause retention of sodium. Furthermore, they cause little or no loss of nitrogen, phosphorus, calcium and potassium from the system of the patient as noted with other forms of cortical steroid therapy.

In accordance with the process of the present invention, suitable starting materials for the synthesis of the compounds described herein include $\Delta^{4,6}$-pregnadiene-11$\beta$,17$\alpha$,21-trihydroxy-3,20-dione, $\Delta^{4,6}$-pregnadiene-17$\alpha$,21-dihydroxy-3,11,20-trione, $\Delta^{1,4,6}$-pregnatriene-17$\alpha$,21-dihydroxy-3,11,20-trione and their 9$\alpha$-halo derivatives, such as $\alpha$-fluoro, $\alpha$-chloro, $\alpha$-bromo and $\alpha$-iodo. These compounds can be prepared from readily available organic starting materials by well-known synthetic and biochemical procedures as previously described in the prior art. See, for instance, Agnello et al., J.A.C.S. 79, 1258 (March 5, 1957); Fried et al., J.A.C.S. 77, 4181 (1955); U.S. Patent 2,831,001; and applicants' U.S. patent application Serial No. 642,361. The process of this invention comprises contacting the above described 21-hydroxy-$\Delta^{4,6}$-corticosteroids with a compound chosen from the group consisting of methanesulfonyl chloride, ethanesulfonyl chloride, benzenesulfonyl chloride and p-toluenesulfonyl chloride; treating the resulting 21-ester with a compound chosen from the group consisting of alkali metal iodides and bromides; and then subsequently contacting the resulting 21-iodo or -bromo compound with an inorganic fluoride, preferably sodium fluoride, potassium fluoride, cuprous fluoride, silver fluoride or mercurous fluoride.

A preferred embodiment of the foregoing process is carried out by contacting the 21-hydroxy compound in an organic base solvent, such as trimethylamine, triethylamine, diethylaniline and pyridine, with p-toluenesulfonyl chloride dissolved in a chlorinated hydrocarbon solvent, such as methylene chloride, chloroform, carbon tetrachloride, ethylene dichloride and tetrachlorethylene at a temperature in the range from about $-20°$ to about $+10°$ C. for a time period preferably in the range of from about 0.5 to 4 hours; treating the resulting 21-tosyl intermediate in an inert neutral, polar organic solvent, such as acetone or lower alkanols, with an alkali metal iodide, such as sodium iodide, potassium iodide, etc.; and then subsequently contacting the resulting 21-iodo compound in an inert polar organic solvent, such as acetone or acetonitrile, with silver fluoride, preferably in the range of about 20° to about 50° C.

The first step of this process involves the formation of the p-toluenesulfonic acid ester (the "tosylate"). As an illustration, the 21-tosylates are most desirably prepared in pure condition and in good yields by dissolving the corresponding 21-hydroxy-$\Delta^6$-corticosteroid in anhydrous pyridine or diethylaniline at room temperature, cooling the solution in a Dry Ice-acetone bath to about $-20°$ C., adding at least an equimolar amount of tosyl chloride dissolved in dry methylene chloride and cooled to such an extent that the tosyl chloride just remains in solution, allowing the mixture to stand in the Dry Ice-acetone bath for about two hours with constant agitation, and finally allowing the reaction mixture to stand at a temperature in the range of $-18°$ to $+2°$ C. for a period of from about 13 to about 20 hours. In this reaction, pyridine not only acts as a solvent but also serves to accelerate the reaction rate as it removes the hydrogen chloride by-product due to salt formation; this in turn, shifts the equilibrium in favor of the tosylate.

The second step of this process is most preferably carried out by treating the 21-tosyl intermediate with at least an equimolar amount of sodium iodide in acetone or a lower alkanol, affording the corresponding 21-iodo-$\Delta^6$-corticosteroids. This reaction is most conveniently carried out at the reflux temperature, but it may be performed at any temperature in the range of about 20° to about 100° C., although most preferably in the range of from about 40° to about 60° C. These 21-iodosteroids are pale-yellow crystalline substances which are very stable; they retain this light color even after storage for about six months without exposure to light.

The 21-fluoro compounds are preferably prepared from the 21-iodo compounds by means of an inorganic fluoride, preferably sodium fluoride, potassium fluoride, cuprous fluoride, silver fluoride or mercurous fluoride. In particular, the 21-iodo-$\Delta^6$-corticosteroid is dissolved in moist acetonitrile, and treated with a slight molar excess of a 50% aqueous solution of silver fluoride at a temperature preferably in the range from about 20° to about 50° C. Upon termination of the reaction, a precipitate of silver iodide separates out, the 21-fluorosteroid remaining in solution; evaporation of the filtrate in vacuo easily affords the desired product.

The therapeutically active compounds of this invention may be administered either alone or in combination with an acceptable pharmaceutical carrier. Selection of the latter is determined by the preferred route of administration, the solubility of the compound and standard pharmaceutical practices. In general, the dosage of these compounds is approximately of the same order of magnitude as the dosage of cortisone, hydrocortisone and prednisone, in place of which they are used to treat similar types of pathological conditions. However, in view of their great adrenocortical activity, it is sometimes possible to use dosages of these compounds which are lower than those employed with prednisone.

For purposes of oral administration, the compound may be administered in the form of tablets containing excipients such as starch or milk sugar; aqueous suspension and elixirs, which may be sweetened and flavored, may also be used. In order to apply these therapeutic agents topically, they may be prepared in ointment or salve form in suitable bases, particularly in non-aqueous, petrolatum-type bases.

Aqueous suspensions may be employed for intraarticular injection; various suspending and wetting agents may be added to the composition so as to prevent the composition from settling out or from packing down in the bottle in which it is stored. Intramuscular and subcutaneous dosage forms may also be prepared by standard pharmaceutical practices.

This invention is further illustrated by the following examples, which are not to be considered as imposing any limitation thereon.

*Example I*

To a solution of 1 g. of $\Delta^{4,6}$-pregnadiene-11$\beta$,17$\alpha$,21-trihydroxy-3,20-dione in 10 ml. of anhydrous pyridine placed in a Dry Ice-acetone bath was added a solution of 600 mg. of anhydrous tosyl chloride in 6 ml. of dry methylene chloride (this solution had been cooled to such an extent that the tosyl chloride just remained in solution) with constant agitation. After the addition was complete, agitation was continued while the reaction mixture was allowed to stand in the bath for 2 hours at −18° C. and subsequently at +2° C. for about 18 hours. The solution was then diluted with an equal volume of ether and washed twice with water. After drying over anhydrous sodium sulfate, the filtered solution was evaporated in vacuo to dryness. The residue so obtained was dissolved in 5 ml. of methanol and filtered immediately; the filtrate on standing deposited crystals of 21-tosyl-$\Delta^{4,6}$-pregnadiene-11$\beta$,17$\alpha$,21-trihydroxy-3,20-dione which were then filtered and air dried to constant temperature.

To a solution of 1 g. of this intermediate in 5 ml. of acetone was added a solution of 1 g. of sodium iodide in 7 ml. of acetone. The reaction mixture was then refluxed for 10 minutes, after which time the acetone was distilled off in vacuo until about one-fourth of the original volume remained. This residual solution was then cooled to induce crystallization of the desired product. The pale-yellow precipitate, which formed immediately, was collected, washed thoroughly with water and air dried; recrystallization of this material from methanol-chlorform afforded pure 21-iodo-$\Delta^{4,6}$-pregnadiene-11$\beta$,17$\alpha$-dihydroxy-3,20-dione. When sodium bromide was employed as the halogenating agent, the product obtained was 21-bromo-$\Delta^{4,6}$-pregnadiene-11$\beta$-17$\alpha$-dihydroxy-3,20-dione.

*Example II*

To a solution of 21-iodo-$\Delta^{4,6}$-pregnadiene-11$\beta$,17$\alpha$-dihydroxy-3,20-dione dissolved in moist acetonitrile was added a slight excess of a 50% aqueous solution of silver fluoride at 30° to 40° C. A precipitate of silver iodide separated immediately and was removed by means of filtration, while the fluorosteroid remained in solution. Upon evaporation of the solvent in vacuo, the desired material separated out. It was then filtered, washed with water and air-dried; recrystallization of this material from methanol-chloroform afforded pure 21-fluoro-$\Delta^{4,6}$-pregnadiene-11$\beta$,17$\alpha$-dihydroxy-3,20-dione. In an analogous manner, 21-bromo-$\Delta^{4,6}$-pregnadiene-11$\beta$,17$\alpha$-dihydroxy-3,20-dione afforded the same product.

In a similar manner, the 9$\alpha$-bromo and 9$\alpha$-iodo derivatives of these compounds were prepared. Furthermore, these same reactions have also been carried out by employing either sodium fluoride, potassium fluoride, cuprous fluoride or mercurous fluoride in place of the silver fluoride.

*Example III*

$\Delta^{4,6}$-pregnadiene-17$\alpha$,21-dihydroxy-3,11,20-trione was subjected to the series of reactions as described in Examples I and II. The corresponding 21-tosyl and 21-iodo intermediates were obtained, as well as the final product, 21-fluoro-$\Delta^{4,6}$-pregnadiene-17$\alpha$-hydroxy-3,11,20-trione.

In a similar manner, the 9$\alpha$-chloro, 9$\alpha$-bromo and 9$\alpha$-iodo derivatives of these compounds were prepared.

*Example IV*

9$\alpha$-fluoro-$\Delta^{4,6}$-pregnadiene-11$\beta$,17$\alpha$,21-trihydroxy-3,20-dione and 9$\alpha$-fluoro-$\Delta^{4,6}$-pregnadiene-17$\alpha$,21-dihydroxy-3,11,20-trione were both subjected to the series of reaction described in Examples I and II. In each case, the corresponding 21-tosyl and 21-iodo intermediates were obtained as well as the final products, 9$\alpha$,21-difluoro-$\Delta^{4,6}$-pregnadiene-11$\beta$,17$\alpha$-dihydroxy-3,20-dione, and 9$\alpha$,21-difluoro-$\Delta^{4,6}$-pregnadiene-17$\alpha$-hydroxy-3,11,20-trione, respectively.

*Example V*

$\Delta^{1,4,6}$-pregnatriene-11$\beta$,17$\alpha$,21-trihydroxy-3,20-dione and $\Delta^{1,4,6}$-pregnatriene-17$\alpha$,21-dihydroxy-3,11,20-trione were both subjected to the series of reactions described in Examples I and II. In each case, the corresponding 21-tosyl and 21-iodo or -bromo intermediates were obtained, as well as the desired final products, 21-fluoro-$\Delta^{1,4,6}$-pregnatriene-11$\beta$,21-dihydroxy-3,20-dione and 21-fluoro-$\Delta^{1,4,6}$-pregnatriene-17$\alpha$-hydroxy-3,11,20-trione, respectively.

In an analogous manner the 9$\alpha$-fluoro derivatives of these $\Delta^{1,4,6}$-pregnatrienes were prepared, that is to say, the final products obtained were 9$\alpha$,21-difluoro-$\Delta^{1,4,6}$-pregnatriene-11$\beta$,17$\alpha$-dihydroxy-3,20-dione and 9$\alpha$,21-difluoro-$\Delta^{1,4,6}$-pregnatriene-17$\alpha$-hydroxy-3,11,20-trione, respectively. In a similar manner, the 9$\alpha$-chloro, 9$\alpha$-bromo and 9$\alpha$-iodo derivatives were also prepared.

What is claimed is:

1. A compound selected from the class consisting of:

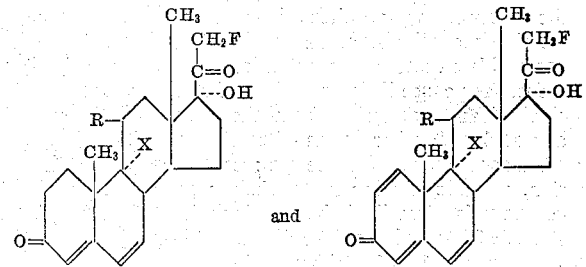

wherein R is chosen from the group consisting of keto and $\beta$-hydroxyl, and X is chosen from the group consisting of $\alpha$-hydrogen, $\alpha$-fluorine, $\alpha$-chlorine, $\alpha$-bromine and $\alpha$-iodine.

2. A pharmaceutical composition comprising a compound as claimed in claim 1 together with a pharmaceutically acceptable carrier.

3. $9\alpha,21$ - difluoro - $\Delta^{1,4,6}$ - pregnatriene - $11\beta,17\alpha$ - dihydroxy-3,20-dione.

4. $9\alpha,21$ - difluoro - $\Delta^{4,6}$ - pregnadiene - $11\beta,17\alpha$ - dihydroxy-3,20-dione.

5. 21 - fluoro - $\Delta^{1,4,6}$ - pregnatriene - $11\beta,17\alpha$ - dihydroxy-3,20-dione.

6. 21 - fluoro - $\Delta^{4,6}$ - pregnadiene - $11\beta,17\alpha$ - dihydroxy-3,20-dione.

References Cited in the file of this patent
UNITED STATES PATENTS

| | | |
|---|---|---|
| 2,739,974 | Colton | Mar. 27, 1956 |
| 2,756,179 | Fried | July 24, 1956 |

OTHER REFERENCES

Tannahauser et al.: J.A.C.S., June 5, 1956, pages 2658–2659.

Herz et al.: J.A.C.S., September 20, 1956, pages 4812–4814.